(12) United States Patent
Bandil et al.

(10) Patent No.: US 10,977,460 B2
(45) Date of Patent: Apr. 13, 2021

(54) SYSTEMS AND METHODS FOR PALLET TRACKING USING HUB AND SPOKE ARCHITECTURE

(71) Applicant: BXB Digital Pty Limited, Sydney (AU)

(72) Inventors: Sandeep K. Bandil, Los Altos, CA (US); Jun Shi, Palo Alto, CA (US)

(73) Assignee: BXB DIGITAL PTY LIMITED, Sydney (AU)

( * ) Notice: Subject to any disclaimer, the term of this patent is extended or adjusted under 35 U.S.C. 154(b) by 0 days.

(21) Appl. No.: 16/104,983

(22) Filed: Aug. 20, 2018

(65) Prior Publication Data

US 2019/0057231 A1    Feb. 21, 2019

Related U.S. Application Data

(60) Provisional application No. 62/548,127, filed on Aug. 21, 2017.

(51) Int. Cl.
| | |
|---|---|
| *G06K 7/10* | (2006.01) |
| *G06Q 10/08* | (2012.01) |
| *G08C 17/02* | (2006.01) |

(52) U.S. Cl.
CPC ......... *G06K 7/10425* (2013.01); *G06Q 10/08* (2013.01); *G08C 17/02* (2013.01); *G06K 2007/10504* (2013.01)

(58) Field of Classification Search
None
See application file for complete search history.

(56) References Cited

U.S. PATENT DOCUMENTS

| 681,428 A | 8/1901 | Ambrose |
| 5,438,607 A | 8/1995 | Przygoda, Jr. et al. |
| 5,491,486 A | 2/1996 | Welles, II et al. |
| (Continued) | | |

FOREIGN PATENT DOCUMENTS

| CA | 2185354 | 9/1995 |
| DE | 9306107 | 8/1994 |
| (Continued) | | |

OTHER PUBLICATIONS

International Application No. PCT/US2018/047035, "International Search Report and Written Opinion" dated Oct. 31, 2018, 10 pages.

(Continued)

*Primary Examiner* — Christle I Marshall
(74) *Attorney, Agent, or Firm* — Kilpatrick Townsend & Stockton LLP

(57) ABSTRACT

According to some embodiments of the invention, data may be collected from multiple tagged pallets by a mobile reader pallet. The tagged pallets may include components capable of short range communication with the mobile reader pallet. The reader pallet may include components capable of long range communication that allow the reader pallet to transmit the data to another device or server. This may result in reduced costs and battery preservation, as each pallet does not need to include costly and power intensive long range communication components. Further, because the reader pallet is mobile, movement of the tagged pallets within range of a stationary reader is not needed.

19 Claims, 8 Drawing Sheets

(56) References Cited

U.S. PATENT DOCUMENTS

| | | | |
|---|---|---|---|
| 5,691,980 A * | 11/1997 | Welles, II | B61L 25/021 |
| | | | 370/316 |
| 5,774,876 A * | 6/1998 | Woolley | G01S 5/0289 |
| | | | 235/385 |
| 5,844,482 A | 12/1998 | Guthrie et al. | |
| 6,199,488 B1 | 3/2001 | Favaron et al. | |
| 6,294,114 B1 | 9/2001 | Muirhead | |
| 6,373,389 B1 | 4/2002 | Przygoda, Jr. et al. | |
| 6,415,223 B1 | 7/2002 | Lin et al. | |
| 6,483,434 B1 | 11/2002 | Umiker | |
| 6,600,418 B2 | 7/2003 | Francis et al. | |
| 6,661,339 B2 | 12/2003 | Muirhead | |
| 6,669,089 B2 | 12/2003 | Cybulski et al. | |
| 6,700,533 B1 | 3/2004 | Werb et al. | |
| 6,707,381 B1 | 3/2004 | Maloney | |
| 6,717,517 B2 | 4/2004 | Przygoda, Jr. | |
| 6,718,888 B2 | 4/2004 | Muirhead et al. | |
| 6,749,418 B2 | 6/2004 | Muirhead | |
| 6,814,287 B1 | 11/2004 | Chang et al. | |
| 6,900,815 B2 | 5/2005 | Yoshioka | |
| 6,934,625 B2 | 8/2005 | Haddad | |
| 6,943,678 B2 | 9/2005 | Muirhead | |
| 7,026,937 B2 | 4/2006 | Przygoda, Jr. | |
| 7,034,683 B2 | 4/2006 | Ghazarian | |
| 7,100,052 B2 | 8/2006 | Ghazarian | |
| 7,133,704 B2 | 11/2006 | Twitchell, Jr. | |
| 7,155,264 B2 | 12/2006 | Twitchell, Jr. | |
| 7,173,529 B2 | 2/2007 | Przygoda, Jr. | |
| 7,209,771 B2 | 4/2007 | Twitchell, Jr. | |
| 7,242,306 B2 | 7/2007 | Wildman et al. | |
| 7,252,230 B1 | 8/2007 | Sheikh et al. | |
| 7,313,476 B2 | 12/2007 | Nichols et al. | |
| 7,336,152 B2 | 2/2008 | Horwitz et al. | |
| 7,336,167 B2 | 2/2008 | Olsen, III et al. | |
| 7,336,182 B1 | 2/2008 | Baranowski et al. | |
| 7,342,496 B2 | 3/2008 | Muirhead | |
| 7,365,737 B2 | 4/2008 | Marvit et al. | |
| 7,388,492 B2 | 6/2008 | Watanabe | |
| 7,398,153 B2 | 7/2008 | Workman et al. | |
| 7,400,259 B2 | 7/2008 | O'Connor et al. | |
| 7,443,297 B1 | 10/2008 | Baranowksi et al. | |
| 7,446,658 B2 | 11/2008 | Panotopoulus | |
| 7,564,357 B2 | 7/2009 | Baranowski et al. | |
| 7,633,389 B2 | 12/2009 | Montovani et al. | |
| 7,656,278 B2 | 2/2010 | Onishi et al. | |
| 7,668,596 B2 | 2/2010 | Von Arx et al. | |
| 7,735,430 B2 | 6/2010 | Muirhead | |
| 7,742,745 B2 * | 6/2010 | Twitchell, Jr. | G06Q 10/087 |
| | | | 455/41.2 |
| 7,752,980 B2 | 7/2010 | Muirhead | |
| 7,783,423 B2 | 8/2010 | Verma et al. | |
| 7,789,024 B2 | 9/2010 | Muirhead | |
| 7,804,400 B2 | 9/2010 | Muirhead | |
| 7,874,256 B2 | 1/2011 | Muirhead | |
| 7,903,084 B2 | 3/2011 | Marvit et al. | |
| 7,948,371 B2 | 5/2011 | Muirhead | |
| 7,956,746 B2 | 6/2011 | Truscott et al. | |
| 7,963,235 B2 | 6/2011 | Muirhead | |
| 7,999,670 B2 | 8/2011 | McClellan et al. | |
| 8,036,826 B2 | 10/2011 | MacIntosh et al. | |
| 8,041,079 B2 | 10/2011 | Chiu et al. | |
| 8,077,040 B2 | 12/2011 | Muirhead | |
| 8,095,070 B2 | 1/2012 | Twitchell, Jr. | |
| RE43,178 E | 2/2012 | Ghazarian | |
| 8,111,157 B2 | 2/2012 | Diener et al. | |
| 8,159,338 B2 | 4/2012 | Breed | |
| 8,184,852 B2 | 5/2012 | Hofman et al. | |
| 8,204,439 B2 | 6/2012 | Twitchell, Jr. | |
| 8,210,107 B2 | 7/2012 | Muirhead | |
| 8,219,558 B1 | 7/2012 | Trandal et al. | |
| 8,229,473 B1 | 7/2012 | De La Rue | |
| 8,248,242 B2 | 8/2012 | Caliri et al. | |
| 8,269,605 B2 | 9/2012 | Moore | |
| 8,313,594 B2 | 11/2012 | Muirhead | |
| 8,331,862 B2 | 12/2012 | Twitchell, Jr. | |
| 8,347,794 B2 | 1/2013 | Muirhead | |
| 8,511,555 B2 | 8/2013 | Babcock et al. | |
| 8,514,058 B2 | 8/2013 | Cameron | |
| 8,585,850 B2 | 11/2013 | Muirhead | |
| 8,594,923 B2 | 11/2013 | Wong et al. | |
| 8,630,768 B2 | 1/2014 | McClellan et al. | |
| 8,692,764 B2 | 4/2014 | Marvit et al. | |
| 8,694,251 B2 | 4/2014 | Janardhanan et al. | |
| 8,718,372 B2 | 5/2014 | Holeva et al. | |
| 8,830,072 B2 | 9/2014 | Batra et al. | |
| 8,849,007 B2 | 9/2014 | Holeva et al. | |
| 8,977,032 B2 | 3/2015 | Holeva et al. | |
| 9,025,827 B2 | 5/2015 | Holeva et al. | |
| 9,025,886 B2 | 5/2015 | Holeva et al. | |
| 9,082,195 B2 | 7/2015 | Holeva et al. | |
| 9,087,384 B2 | 7/2015 | Holeva et al. | |
| 9,230,227 B2 * | 1/2016 | Muirhead | G06Q 10/0631 |
| 9,466,198 B2 | 10/2016 | Burch et al. | |
| 9,488,986 B1 | 11/2016 | Solanki | |
| 9,504,414 B2 | 11/2016 | Coza et al. | |
| 9,613,239 B2 | 4/2017 | Lee et al. | |
| 9,635,346 B2 | 4/2017 | Iida | |
| 9,656,485 B2 | 5/2017 | Asai et al. | |
| 9,679,237 B2 | 6/2017 | Linkesch et al. | |
| 9,813,850 B2 * | 11/2017 | Lee | H04W 4/02 |
| 9,868,212 B1 | 1/2018 | Hinterstoisser | |
| 9,947,196 B2 * | 4/2018 | Lee | G06K 19/0723 |
| 9,965,662 B2 | 5/2018 | Lee et al. | |
| 10,102,629 B1 | 10/2018 | Li | |
| 10,242,273 B1 | 3/2019 | Eckman | |
| 10,328,578 B2 | 6/2019 | Holz | |
| 10,339,619 B2 | 7/2019 | Muirhead | |
| 10,346,797 B2 | 7/2019 | Jacobus et al. | |
| 10,347,005 B2 | 7/2019 | Iida et al. | |
| 10,368,222 B2 | 7/2019 | Carlson et al. | |
| 10,491,375 B2 | 11/2019 | Maggu et al. | |
| 10,549,885 B2 * | 2/2020 | de Bokx | B65D 19/44 |
| 10,614,319 B2 | 4/2020 | Douglas et al. | |
| 1,081,663 A1 | 10/2020 | Conners et al. | |
| 2002/0047850 A1 | 4/2002 | Yoshioka | |
| 2002/0070862 A1 | 6/2002 | Francis et al. | |
| 2003/0083964 A1 | 5/2003 | Horwitz et al. | |
| 2003/0089771 A1 | 5/2003 | Cybulski et al. | |
| 2003/0137968 A1 | 7/2003 | Lareau et al. | |
| 2003/0170357 A1 | 9/2003 | Garwood | |
| 2004/0015264 A1 | 1/2004 | Holland et al. | |
| 2004/0103031 A1 | 5/2004 | Weinschenk | |
| 2004/0113786 A1 | 6/2004 | Maloney | |
| 2004/0233041 A1 * | 11/2004 | Bohman | G06K 7/0008 |
| | | | 340/10.1 |
| 2005/0046567 A1 | 3/2005 | Mortenson et al. | |
| 2005/0063590 A1 | 3/2005 | Simon et al. | |
| 2005/0226819 A1 | 10/2005 | Beach et al. | |
| 2005/0231366 A1 | 10/2005 | McHugh et al. | |
| 2006/0232412 A1 | 10/2006 | Tabacman et al. | |
| 2006/0254474 A1 | 11/2006 | Roth et al. | |
| 2006/0261959 A1 | 11/2006 | Worthy et al. | |
| 2007/0091292 A1 | 4/2007 | Cho et al. | |
| 2007/0095905 A1 | 5/2007 | Kadaba | |
| 2007/0108296 A1 | 5/2007 | Konopka et al. | |
| 2007/0282482 A1 | 12/2007 | Beucher et al. | |
| 2008/0106468 A1 | 5/2008 | Litva et al. | |
| 2008/0114487 A1 | 5/2008 | Schuler et al. | |
| 2008/0143484 A1 | 6/2008 | Twitchell | |
| 2010/0006377 A1 | 1/2010 | McCabe | |
| 2010/0299278 A1 | 11/2010 | Kriss et al. | |
| 2010/0310182 A1 | 12/2010 | Kroepfl et al. | |
| 2010/0332407 A1 | 12/2010 | Grieve et al. | |
| 2011/0040440 A1 | 2/2011 | de Oliveira et al. | |
| 2011/0095871 A1 | 4/2011 | Kail et al. | |
| 2011/0169636 A1 | 7/2011 | Kadaba | |
| 2011/0227725 A1 | 9/2011 | Muirhead | |
| 2011/0251920 A1 | 10/2011 | Watson | |
| 2011/0266338 A1 | 11/2011 | Babcock et al. | |
| 2012/0066511 A1 | 3/2012 | Scheidt et al. | |
| 2012/0105202 A1 | 5/2012 | Gits et al. | |
| 2012/0126000 A1 | 5/2012 | Kunzig et al. | |
| 2012/0232430 A1 | 9/2012 | Boissy et al. | |
| 2012/0239499 A1 | 9/2012 | Zughaib et al. | |

(56) References Cited

U.S. PATENT DOCUMENTS

| | | | |
|---|---|---|---|
| 2012/0252501 | A1 | 10/2012 | Smith et al. |
| 2012/0323431 | A1 | 12/2012 | Wong et al. |
| 2013/0041290 | A1 | 2/2013 | Kording et al. |
| 2013/0041617 | A1 | 2/2013 | Pease et al. |
| 2013/0045760 | A1 | 2/2013 | Obermeyer et al. |
| 2013/0101230 | A1 | 4/2013 | Holeva et al. |
| 2013/0324151 | A1 | 12/2013 | Lee et al. |
| 2014/0016821 | A1 | 1/2014 | Arth et al. |
| 2014/0049392 | A1 | 2/2014 | Wagner |
| 2014/0062774 | A1 | 3/2014 | Hale et al. |
| 2014/0120945 | A1 | 5/2014 | Sharma et al. |
| 2014/0193077 | A1 | 7/2014 | Shiiyama et al. |
| 2014/0222711 | A1 | 8/2014 | Tibbs et al. |
| 2014/0289020 | A1 | 9/2014 | Schullian et al. |
| 2014/0297485 | A1 | 10/2014 | Steely et al. |
| 2015/0039529 | A1 | 2/2015 | Barakat |
| 2015/0120597 | A1 | 4/2015 | Dertadian |
| 2015/0127496 | A1 | 5/2015 | Marathe et al. |
| 2015/0146989 | A1 | 5/2015 | Shiiyama et al. |
| 2015/0379510 | A1 | 12/2015 | Smith |
| 2016/0021636 | A1 | 1/2016 | Krallman et al. |
| 2016/0063550 | A1 | 3/2016 | Caldwell |
| 2016/0189000 | A1 | 6/2016 | Dube et al. |
| 2016/0198341 | A1 | 7/2016 | Fransen |
| 2016/0198431 | A1 | 7/2016 | Pattabiraman et al. |
| 2016/0205500 | A1 | 7/2016 | Lee et al. |
| 2016/0205654 | A1 | 7/2016 | Robinson |
| 2016/0239706 | A1 | 8/2016 | Dijkman et al. |
| 2016/0260059 | A1 | 9/2016 | Benjamin et al. |
| 2016/0260301 | A1 | 9/2016 | Miller et al. |
| 2016/0321729 | A1 | 11/2016 | Westphal |
| 2017/0015111 | A1 | 1/2017 | Asai et al. |
| 2017/0019264 | A1 | 1/2017 | Nugent et al. |
| 2017/0140408 | A1 | 5/2017 | Wuehler |
| 2017/0243103 | A1 | 8/2017 | Linkesch et al. |
| 2017/0323412 | A1 | 11/2017 | Muirhead |
| 2017/0366357 | A1 | 12/2017 | Pattanaik et al. |
| 2017/0372103 | A1 | 12/2017 | Lee et al. |
| 2018/0009234 | A1 | 1/2018 | Ohi et al. |
| 2018/0038805 | A1 | 2/2018 | Heikkila et al. |
| 2018/0039524 | A1 | 2/2018 | Dettori et al. |
| 2018/0082390 | A1 | 3/2018 | Leidner et al. |
| 2018/0089638 | A1 | 3/2018 | Christidis et al. |
| 2018/0143995 | A1 | 5/2018 | Bailey et al. |
| 2018/0196680 | A1 | 7/2018 | Wang et al. |
| 2018/0232693 | A1 | 8/2018 | Gillen et al. |
| 2018/0268348 | A1 | 9/2018 | Guan |
| 2018/0293645 | A1 | 10/2018 | Pannicke et al. |
| 2018/0304468 | A1 | 10/2018 | Holz |
| 2018/0322453 | A1 | 11/2018 | Lantz et al. |
| 2018/0342032 | A1 | 11/2018 | Daigle et al. |
| 2019/0012637 | A1 | 1/2019 | Gillen |
| 2019/0019144 | A1 | 1/2019 | Gillen |
| 2019/0080392 | A1 | 3/2019 | Youb et al. |
| 2019/0098432 | A1 | 3/2019 | Carlson et al. |
| 2019/0109702 | A1 | 4/2019 | Maggu et al. |
| 2019/0130345 | A1 | 5/2019 | Antor et al. |
| 2019/0190719 | A1 | 6/2019 | van de Ruit et al. |
| 2019/0251385 | A1 | 8/2019 | Kotula |
| 2019/0259062 | A1 | 8/2019 | Caldwell |
| 2019/0340623 | A1 | 11/2019 | Rivkind et al. |
| 2019/0370816 | A1 | 12/2019 | Hu |
| 2020/0019927 | A1 | 1/2020 | Muirhead |
| 2020/0118117 | A1 | 4/2020 | McManus et al. |
| 2020/0209343 | A1 | 7/2020 | Connors et al. |
| 2020/0272986 | A1 | 8/2020 | Bandil et al. |

FOREIGN PATENT DOCUMENTS

| | | |
|---|---|---|
| DE | 102006009802 | 4/2007 |
| DE | 202012008230 | 10/2012 |
| EP | 1246094 | 10/2002 |
| EP | 3128471 | 2/2017 |
| EP | 2593372 | 2/2018 |
| EP | 3323756 | 5/2018 |
| JP | 2006243873 | 9/2016 |
| JP | 2017019586 | 1/2017 |
| WO | 9616387 | 5/1996 |
| WO | 2008038017 | 4/2008 |
| WO | 2010114478 | 10/2010 |
| WO | 2017165909 | 10/2017 |
| WO | 2019010480 | 1/2019 |

OTHER PUBLICATIONS

International Application No. PCT/US2018/047035, "International Preliminary Report on Patentability", dated Mar. 5, 2020, 7 pages.
GoTo Pallets inc. "The future of the pallet pooling industry begins with the G2 Pallet." Retrieved capture from http://gotopallets.com for the date of Oct. 1, 2016, 77 pages.
Roussel, J., "Making the Supply Chain Everyone's Business," May 9, 2014, 8 pages.
"Recommendations on the Grocery Industry Pallet System," written for the The Grocery Industry Pallet Subcommittee by Cleveland Consulting Associates, Jan. 1, 1992, 16 pages.
GoTo Pallets Marketing Brochure dated Oct. 12, 2016. Retrieved from http://gotopallets.com.
Anonymous, "Geo-Fence", Wikipedia, Available Online at, URL:https://en.wikipedia.Org/w/index.php?title=Geofence&oldid=768541623, Mar. 4, 2017, 3 pages.
Intermec's Intellitag RFID Technology Enables CHEP's. Global Pallet Tracking Business Wire Nov. 13, 2001: 0480.
International Search Report and Written Opinion for PCT/US2018/026461 dated Jul. 5, 2018, all pages.
International Preliminary Report on Patentability for PCT/US2018/026461 dated Jun. 25, 2019, all pages.
International Search Report and Written Opinion for PCT/US2018/030659 dated Aug. 3, 2018, all pages.
International Preliminary Report on Patentability for PCT/US2018/030659 dated Aug. 7, 2019, all pages.
International Search Report and Written Opinion for PCT/US2018/030672 dated Jul. 13, 2018, all pages.
International Preliminary Report on Patentability for PCT/US2018/030672 dated Nov. 14, 2019, all pages.
International Search Report and Written Opinion for PCT/US2018/031367 dated Aug. 1, 2018, all pages.
International Preliminary Report on Patentability for PCT/US2018/031367 dated Sep. 6, 2019, all pages.
International Search Report and Written Opinion for PCTNS2018/034083 dated Oct. 24, 2018, 11 pages.
International Preliminary Report on Patentability for PCT/US2018/034083 dated Nov. 26, 2019, all pages.
International Search Report and Written Opinion for PCT/US2018/045964 dated Nov. 19, 2018, all pages.
International Preliminary Report on Patentability for PCT/US2018/045964 dated Apr. 30, 2020, all pages.
International Search Report and Written Opinion for PCT/US2018/048832 dated Oct. 30, 2018, all pages.
International Preliminary Report on Patentability for PCT/US2018/048832 dated May, 2020, all pages.
International Search Report and Written Opinion for PCT/US2019/068476 dated Feb. 25, 2020, all pages.
International Search Report and Written Opinion for PCT/US2020/019698 dated Jun. 30, 2020, all pages.
Jihoon et al., "Geo-Fencing: Geographical-Fencing Based Energy-Aware Proactive Framework for Mobile Devices," Quality of Service (IWZOS), 2012 IEEE 20th International Workshop, Jun. 4, 2012, pp. 1-9.
Mohamed, "Detection and Tracking of Pallets using a Laser Rangefinder and Machine Learning Techniques," Retrieved from https://www.researchgate.net/profile/Ihab_S_Mohamed/publication/324165524_Detection_and_Tracking_of_Pallets_using_a_Laser_Rangefinder_and_Machine_Learning_Techniques/links/5ac2b5300f7e9bfc045f3547/Detection-and-Tracking-of-Pallets-using-a-Laser-Rangefinder, Sep. 22, 2017, 76 pages.
Pallet tracking leads RFID applications. (News Briefs). Knill, Bernie. Material Handling Management 57.1: 8(2). Penton Media, Inc., Penton Business Media, Inc. and their subsidiaries. (Jan. 2002).

(56) References Cited

OTHER PUBLICATIONS

Weber et al., "Untrusted Business Process Monitoring and Execution Using Blockchain," Medical Image Computing and Computer-Assisted Intervention—Miccai 2015 : 18th International Conference, Munich, Germany, Sep. 8, 2016, pp. 329-347.
Xin et al., "Large Visual Repository Search with Hash Collision Design Optimization", IEEE MultiMedia, IEEE Service Center, vol. 20, Issue 2, Apr. 2013, pp. 62-71.
G. Yang, K. Xu and V.O.K. Lit, "Hybride Cargo-Level Tracking System for Logistics," IEEE 71st Vehicular Technology Conference, Taipei, 2010, pp. 1-5, doi: 10.1109/VETECS.2010.5493655. (Year: 2010).

* cited by examiner

SYSTEMS AND METHODS FOR PALLET TRACKING USING HUB AND SPOKE ARCHITECTURE

CROSS-REFERENCES TO RELATED APPLICATIONS

This application claims the benefit of U.S. Provisional Patent Application No. 62/548,127, filed Aug. 21, 2017, which is herein incorporated by reference in its entirety.

FIELD

The present disclosure generally relates to cargo transportation utilizing pallets, and more specifically to systems and methods for pallet tracking using a hub and spoke architecture.

BACKGROUND

Monitoring pallet movement and environmental conditions through a supply and distribution chain can aid in diagnosing issues with loss and recovery, damage and cycle time. Reducing loss, damage and cycle time may have a material economic benefit for entities across the supply chain. Tracking pallets through the supply chain may also facilitate tracking of the assets they carry whenever an association between the two may be captured.

BRIEF SUMMARY

In some systems, pallet data is collected by each pallet in the supply chain and transmitted directly from each pallet to a remote server. This may result in high costs, as each pallet must include components capable of cellular or long range transmission of data. These components may also result in reduced battery power due to a high power requirement. In some systems, pallet data is transmitted from each pallet to a stationary reader in a facility when the pallet comes within range of the stationary reader. The stationary reader may then aggregate the data from multiple pallets and transmit it to a remote server. Such stationary readers may not be ideal for collecting data from all pallets in a facility, as not all of the pallets may come within range of the stationary reader.

Provided are methods, including computer-implemented methods, devices, and computer-program products applying systems and methods for pallet tracking using a hub and spoke architecture. According to some embodiments of the invention, data may be collected from multiple tagged pallets by a mobile reader pallet. The tagged pallets may include components capable of short range communication with the mobile reader pallet. The reader pallet may include components capable of long range communication that allow the reader pallet to transmit the data to another device or server. This may result in reduced costs and battery preservation, as each pallet does not need to include costly and power intensive long range communication components. Further, because the reader pallet is mobile, movement of the tagged pallets within range of a stationary reader is not needed.

According to some embodiments of the invention, a computer-implemented method is provided. The method comprises receiving, at a reader device affixed to a reader pallet of a plurality of pallets, data associated with at least one tagged device affixed to at least one tagged pallet of the plurality of pallets. The reader device is configured to communicate using a first communication protocol and a second communication protocol. The at least one tagged device is configured to communicate using the first communication protocol. The data is received over the first communication protocol. The method further comprises repackaging the data according to the second communication protocol. The method further comprises transmitting the data over the second communication protocol.

According to some embodiments of the invention, a device is provided. The device comprises one or more processors. The device further comprises a non-transitory computer-readable medium containing instructions that, when executed by the one or more processors, cause the one or more processors to perform operations including the steps of the methods described herein.

According to some embodiments of the invention, a computer-program product is provided. The computer-program product is tangibly embodied in a non-transitory machine-readable storage medium of a device. The computer-program product includes instructions that, when executed by one or more processors, cause the one or more processors to perform operations including the steps of the methods described herein.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present invention are described in detail below with reference to the following drawing figures.

DETAILED DESCRIPTION

Figure 1:
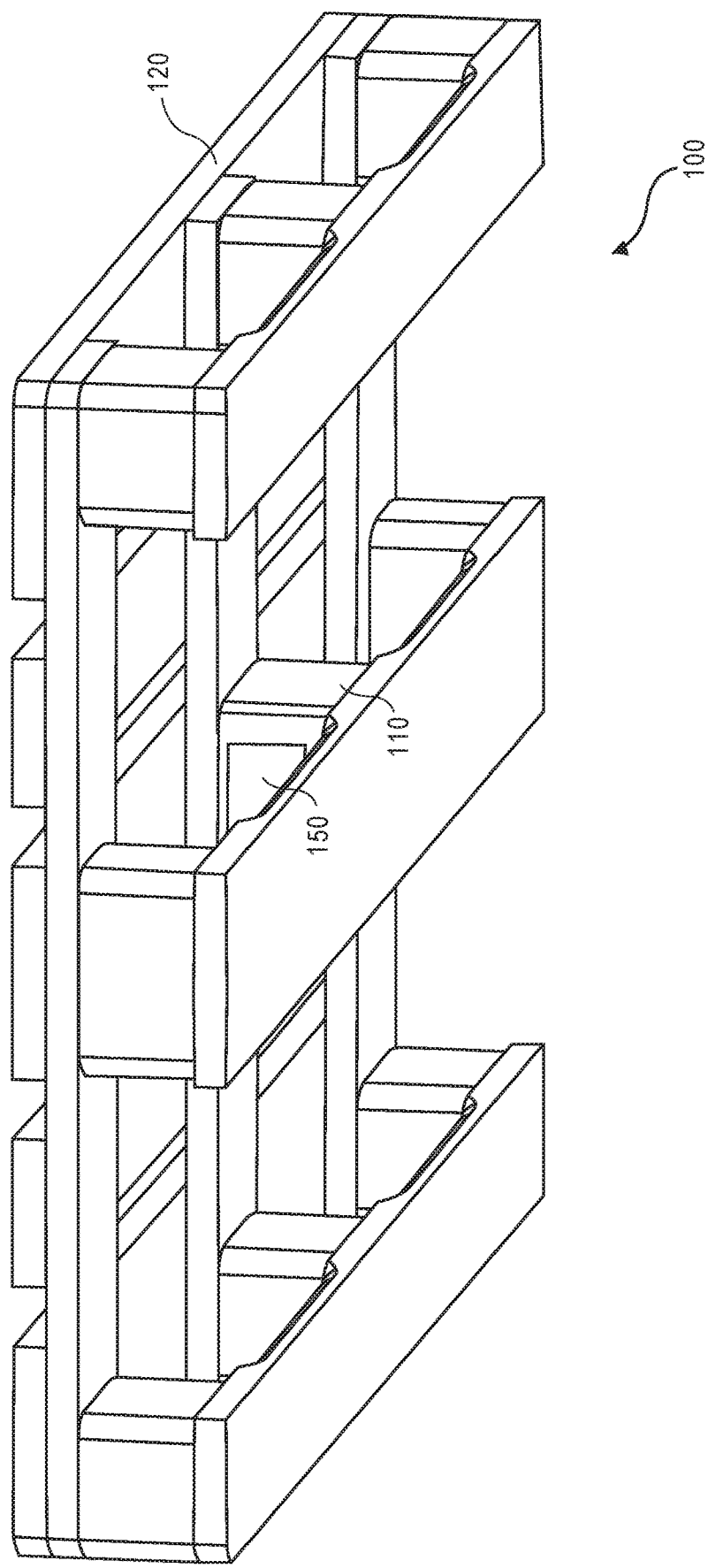
FIG. 1 is a bottom perspective view of a pallet with a beacon, in accordance with some embodiments.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the invention. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s) may perform the necessary tasks.

Pallets

A pallet may be a structure that supports physical assets for storage, presentation, handling, and/or transportation. As used herein, the term "pallet" may be used to describe any load carrier or product conveyance platform, including any type of reusable plastic container (RPC), platform, dolly, bin, keg, box (including corrugated box), container, and the like. The physical assets may be any physical assets, such as perishable or nonperishable physical goods. FIG. 1 is a bottom perspective view of a pallet 100, in accordance with some embodiments. The pallet 100 may include a base 120 and legs 110. The pallet 100 may be of any size, shape, and/or dimension, and may be made of any material or combination of materials. The base 120 and legs 110 may be of any size, shape, and/or dimensions. The base 120 may be flat and/or otherwise configured to support the shape and/or weight of the physical asset to be held on the pallet 100. Although shown as having a particular design in FIG. 1, it is contemplated that any design may be incorporated on or in the base 120. For example, the base 120 may have smaller, larger, fewer, more, differently shaped, or differently placed spacings than those shown in FIG. 1, depending on characteristics of the particular physical asset to be placed on the base 120 (e.g., weight, shape, temperature requirements, size, etc.).

The legs 110 may be sized and positioned to support the particular physical asset. In some embodiments, the legs 110 may be sized and positioned to allow a forklift, crane, or jacking device to engage and lift the pallet 100 between the legs 110. Although shown and described as having three legs 110, it is contemplated that the pallet 100 may have any suitable number of legs or no legs. For example, in some embodiments, the pallet 100 may include a base 120 on both the top and bottom of the pallet 100 with no legs. In another example, for heavier physical assets, the pallet 100 may include one or more additional legs centrally located with respect to the pallet 100 to prevent sagging of the base 120. Further, although shown and described as being in a particular orientation and having a particular size, it is contemplated that the legs 110 may be of any size (e.g., height, length, width, depth, etc.) and/or orientation (e.g., parallel to each other, perpendicular to each other, etc.).

The pallet 100 may be made of any suitable material, depending on the characteristics of the particular physical asset to be supported by the pallet 100. For example, the pallet 100 may be wooden, plastic, and/or metal. Further, the pallet 100 may be a half pallet or a quarter pallet. In some embodiments, the pallet 100 may be constructed to include unique physical features. In some embodiments, the base 120 may be made of a same or different material than the legs 110. In some embodiments, the base 120 and the legs 110 may form a single unitary body (e.g., formed from a single mold). In some embodiments, the base 120 may be removable from one or more of the legs 110.

Figure 2:
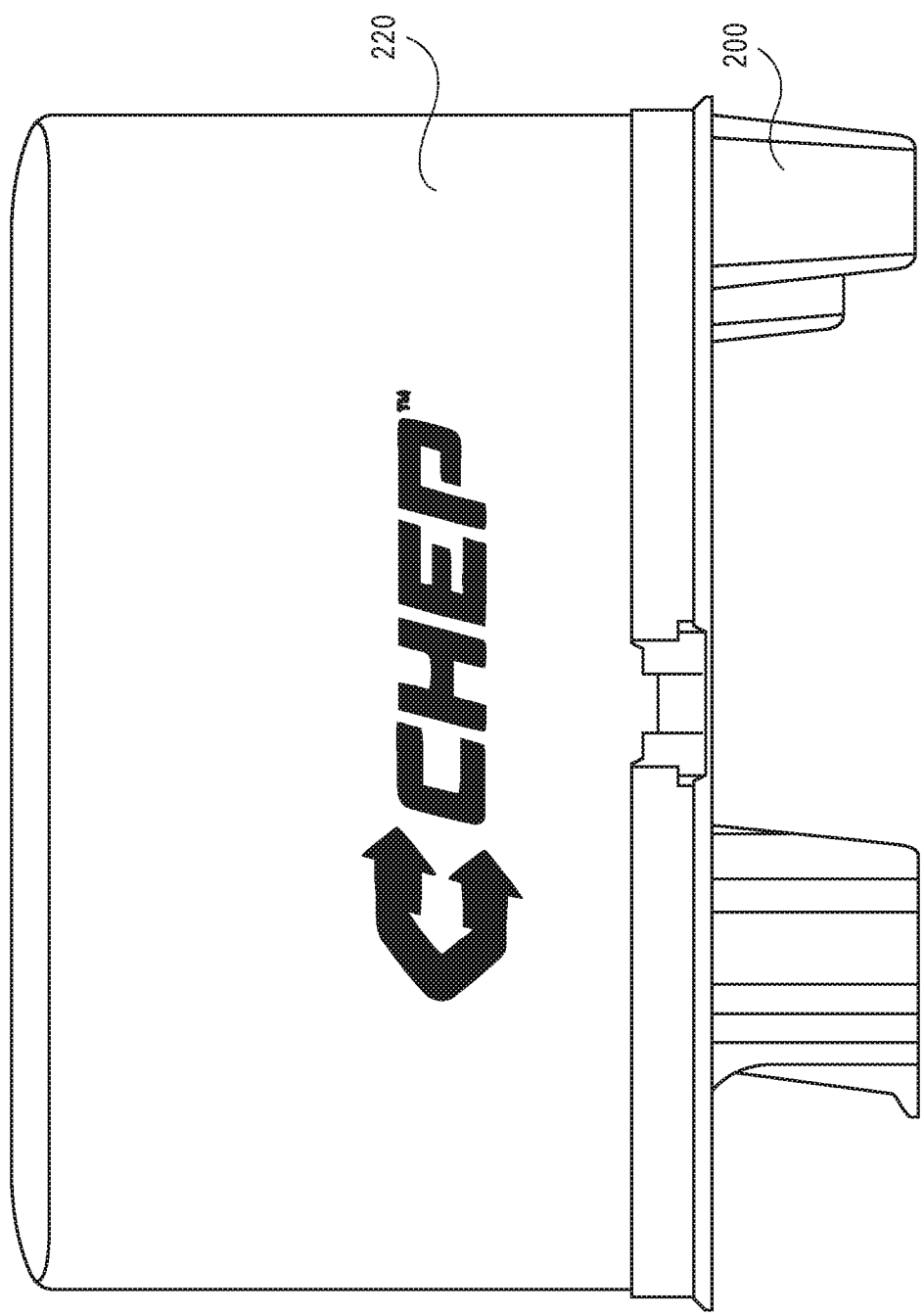
FIG. 2 is a side view of a pallet with a load, in accordance with some embodiments.

In some embodiments, additional components may be integrated with the pallet 100. For example, the underside of the pallet 100 may include a beacon 150. The beacon 150 may include any electronic device capable of handling or storing data. The beacon 150 may include a number of different functionalities. For example, the beacon 150 may be programmed with the type of physical asset located on the pallet 100 and/or an identifier of the pallet 100. The beacon 150 may further include or be in operable communication with one or more sensors configured to monitor certain conditions of the pallet 100 (e.g., environmental conditions, movements, etc.). The beacon 150 may be capable of communication with other devices, such as other beacons, devices, and/or servers. The beacon 150 is described further herein with respect to FIGS. 4 and 5. Although shown as being located in a particular position on the pallet 100, it is contemplated that the beacon 150 may be located in any suitable position on the pallet 100. FIG. 2 is a side view of another exemplary pallet 200 with a load 220 placed atop the pallet 200 for transportation, storage, presentation, etc. As used herein, pallet 100 may be referred to interchangeably with pallet 200.

Systems for Pallet Tracking using a Hub and Spoke Architecture

In some cases, it may be desirable to track a pallet. As used herein, "pallet tracking" may refer to the collecting and tracking of any data related to a pallet, such as a pallet's location in the supply chain and/or environmental or other conditions of the pallet. According to some embodiments of the invention, data may be collected by a plurality of tagged pallets. As used herein, the term "tagged pallet" may refer to a pallet including a beacon and one or more sensors. In some embodiments, a tagged pallet may include an RFID tag. The data collected by the tagged pallets may be transmitted using a short range and/or low power communication protocol by the individual tagged pallets to a reader pallet. As used herein, the term "reader pallet" may refer to a pallet including a beacon capable of both short and long range communication. In some embodiments, the reader pallet may not include any sensors.

Conventional tracking solutions that provide accurate tracking data rely on installed infrastructure, such as proximity sensors and fixed manual or automated processes. According to some embodiments of the invention, however, fixed infrastructure is not needed to determine the tracking data, as it is collected by individual tagged pallets and aggregated by a mobile reader pallet. Once the tracking data has been collected, this information may be used to compute supply chain visibility metrics, such as inventory at any given location or region, dwell time, and velocity metrics between regions of the supply chain or between any set of nodes within the supply chain.

Figure 3:
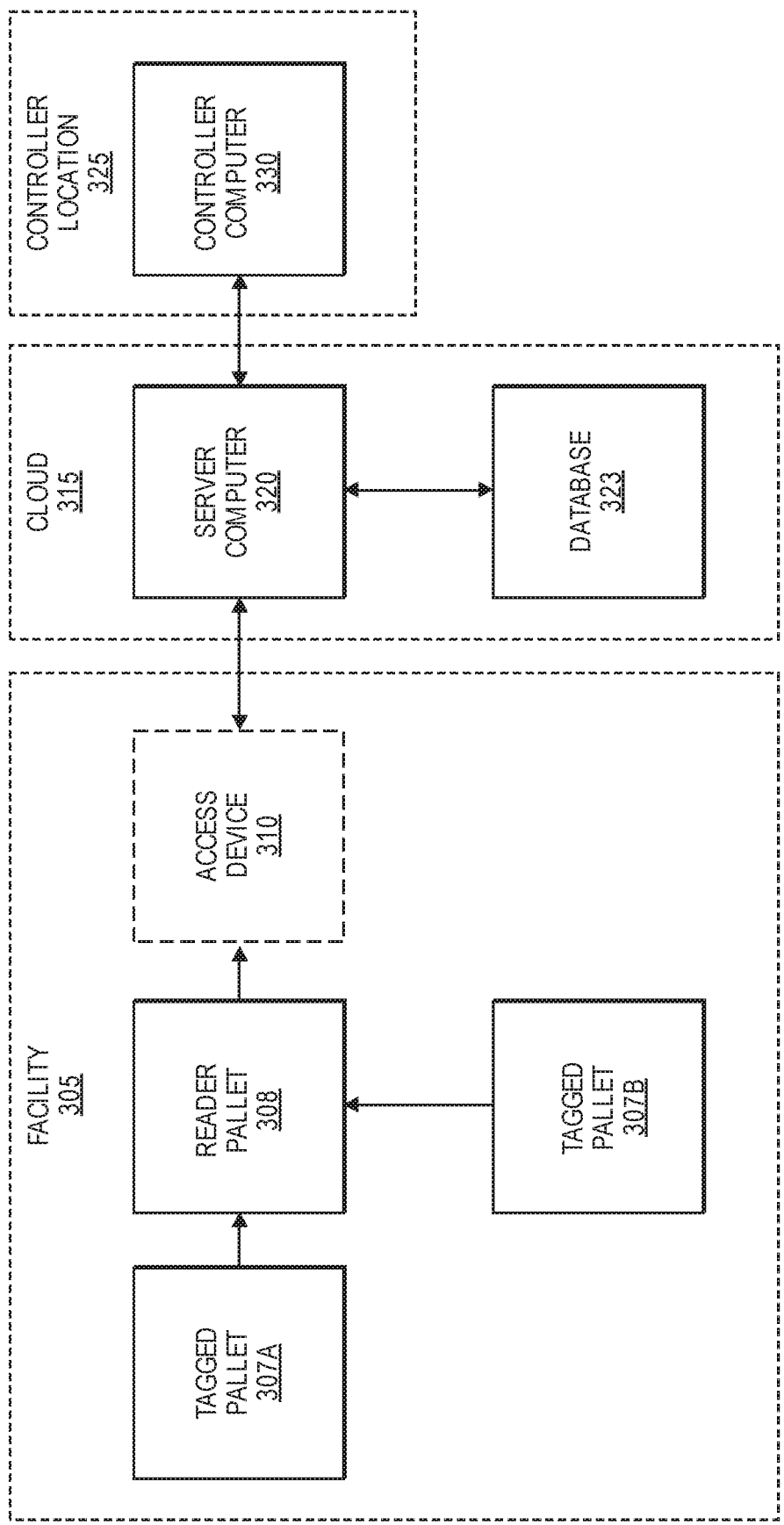
FIG. 3 is a block diagram illustrating a system for pallet tracking, in accordance with some embodiments.

FIG. 3 is a block diagram illustrating a system for pallet tracking using a hub and spoke architecture, in accordance with some embodiments. The system may include tagged pallets 307A-B, a reader pallet 308, an optional access device 310, a server computer 320, a database 323, and a controller computer 330. The tagged pallets 307A-B, the reader pallet 308, and the optional access device 310 may be located at a facility 305 in the supply chain, such as a warehouse or store. The server computer 320 and the database 323 may be located in the cloud 315, such as at one or more offsite or third party locations with online or networked storage. The controller computer 330 may be located at a controller location 325, such as at a pallet logistics and tracking company. Although shown and described with respect to a certain number of entities performing certain functions, it is contemplated that a greater or fewer number of entities may perform the functions described herein. For example, the functions of the server computer 320 may be spread across multiple server computers. In another example, the database 325 may be incorporated internally to the server computer 320.

In some embodiments, the tagged pallets 307A-B may communicate data to the reader pallet 308 via a beacon or other communication medium. The tagged pallets 307A-B may be capable of communicating using only certain communication protocols (e.g., short range or lower power communication protocols, such as Bluetooth LE, WiFi, etc.). The data may cause the reader pallet 308 to perform one or more operations. For example, the reader pallet 308 may aggregate the data received from the tagged pallets 307A-B over a period of time, and transmit the aggregated data to an access device 310. In some embodiments, the access device 410 may only communicate with the pallet 100 if the pallet 100 is a recognized or registered pallet. When the access device 310 receives the data, the access device 310 may forward it to the server computer 320. In another example, the reader pallet 308 may transmit the data directly to the server computer 320. The reader pallet 308 may be capable of communicating with the tagged pallets 307A-B using one or more communication protocols common to both types of pallets (e.g., short range or lower power communication protocols, such as Bluetooth LE, WiFi, etc.). The reader pallet 308 may also be capable of communicating with the access device 310 and/or the server computer 320 using other communication protocols (e.g., long range or higher power communication protocols, such as cellular, GSM, satellite, etc.). Thus, in some embodiments, only the reader pallet 308 may be required to include more costly, longer range communication components; these components may be omitted from the tagged pallets 307A-B.

In some embodiments, the reader pallet 308 may communicate instruction data to the tagged pallets 307A-B via a beacon or other communication medium. The instruction data may be communicated via short range or lower power communication protocols. The instruction data may cause one or more of the tagged pallets 307A-B to perform one or more operations. For example, the instruction data may cause the tagged pallet 307A to change or configure various device parameters or settings.

Although shown and described as being in communication with two tagged pallets 307A-B, it is contemplated that the reader pallet 308 may be in communication with any number of tagged pallets. For example, the ratio of reader pallets to tagged pallets may be many to one, such as ten to one. In some embodiments, the number of tagged pallets with which the reader pallet 308 is in communication may depend upon the number of tagged pallets within communication range of the reader pallet 308. For example, one reader pallet 308 at a facility may be in communication with five tagged pallets, while another reader pallet 308 at the facility may be in communication with twenty tagged pallets.

The optional access device 310 may be any suitable electronic user device. The access device 310 may include a communication device. A communication device may provide remote communication capabilities to a network. Examples of remote communication capabilities include using a mobile phone (wireless) network, wireless data network (e.g., 3G, 4G, 5G, CAT1, LTE-M, LTE-NB1, Sigfox, LoRa, or similar networks), WiFi, Wi-Max, or any other communication medium that may provide access to a network such as the Internet or a private network. Examples of devices include mobile phones (e.g., cellular phones), PDAs, tablet computers, net books, laptop computers, personal music players, handheld specialized readers, watches, fitness bands, wearables, ankle bracelets, rings, earrings, key fobs, physical wallets, glasses, containers, coffee mugs, takeout containers, etc., as well as automobiles with remote communication capabilities. The access device 410 may comprise any suitable hardware and software for performing such functions, and may also include multiple devices or components (e.g., when a device has remote access to a network by tethering to another device—i.e., using the other device as a modem—both devices taken together may be considered a single communication device). Further examples of an access device 310 may include a POS or point of sale device (e.g., POS terminals), cellular phone, PDA, personal computer (PCs), tablet PC, hand-held specialized reader, set-top box, electronic cash register (ECR), virtual cash registers (VCR), kiosk, and the like.

The access device 310 may be in communication with the server computer 320. The access device 310 may forward aggregated tracking data collected by the tagged pallets 307A-B to the server computer 320. The server computer 320 may store the tracking data in a database 323. For example, each piece of tracking data may be received with an associated pallet identifier. Each pallet identifier may have an entry in the database 323 with which the associated tracking data may be stored.

In other words, the server computer 320 may store the tracking data in association with the identifier of the tagged pallet 307A-B in the database 323. For example, the server computer 320 may retrieve the entry in the database 323 associated with the pallet identifier and write the tracking data in the record. In some embodiments, the tracking data may be written to the record along with a timestamp indicating the date and time that the tagged pallet 307A-B transmitted the tracking data. Thus, the record corresponding to a particular pallet may include a plurality of tracking data collected at a plurality of times. In some embodiments, some or all of the functions of the server computer 320 may alternatively or additionally be performed by another entity or system, such as the access device 310.

In some embodiments, the server computer 320 may provide these records from the database 323 to a controller computer 330. The controller computer 330 may be an entity that tracks, maintains, and/or owns the tagged pallets 307A-B and/or the reader pallet 308. The controller computer 330 may use this tracking data to perform analytics. For example, the controller computer 330 may determine whether the tagged pallets 307A-B are at the correct facility 305, to determine where the tagged pallets 307A-B are in the supply chain, to determine the cycle time of the tagged pallets 307A-B, to predict timing of the tagged pallets 307A-B at a particular location, to compute supply chain visibility metrics, etc. In some embodiments, supply chain visibility metrics may include inventory at a given facility or in a given region, dwell time, and velocity metrics between regions or between facilities in the supply chain.

Figure 4:
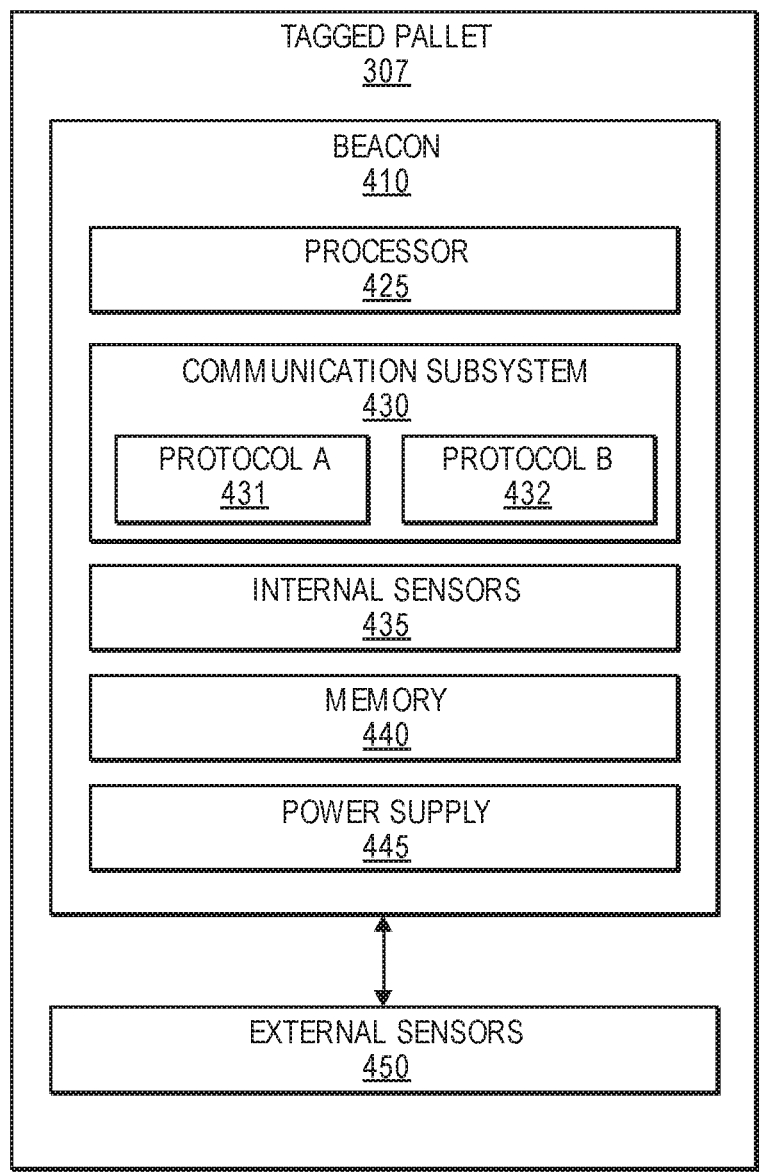
FIG. 4 is a block diagram illustrating a tagged pallet, in accordance with some embodiments.

The tagged pallets 307A-B may include components for performing multiple functions, as described herein. FIG. 4 is a block diagram illustrating the system components of a tagged pallet 307. In some embodiments, tagged pallet 307 may be implemented as tagged pallet 307A and/or tagged pallet 307B. The tagged pallet 307 may include a beacon 410 in operative communication with one or more external sensors 450. The beacon 410 may be implemented as the beacon 150, in some embodiments. The beacon 410 may include device hardware coupled to a memory 440. The device hardware may include a processor 425, a communication subsystem 430, internal sensors 435, and a power supply 445. In some embodiments, the beacon 410 may be implemented as an active tag e.g., an RFID tag). The beacon 410 may be associated with an identifier (e.g., an active tag identifier).

The processor 425 may be implemented as one or more integrated circuits (e.g., one or more single core or multicore microprocessors and/or microcontrollers), and may be used to control the operation of the beacon 410. The processor 425 can execute a variety of programs in response to program code or computer-readable code stored in memory 440, and can maintain multiple concurrently executing programs or processes. The communication subsystem 430 may include one or more transceivers and/or connectors that can be used by the beacon 410 to communicate with other devices (e.g., the external sensors 450, reader pallets, beacons, access devices, etc.) and/or to connect with external networks. In some embodiments, the communication subsystem 430 may be configured to communicate using more than one protocol (e.g., protocol A 431 and protocol B 432). Protocol A 431 and protocol B 432 may be two different wired or wireless communication protocols. For example, protocol A 431 and protocol B 432 may be selected from the group including Bluetooth, Bluetooth LE, near field communication, WiFi, cellular communication, Ethernet, fiber optics, etc. In some embodiments, protocol A 431 and protocol B 432 may both be short range, lower power and/or lower cost communication protocols. The particular protocol used for a particular communication may be determined based on any of a number of factors, including availability, signal strength, type and/or amount of power received from or remaining on power supply 445, power needed to communicate on a particular protocol, cost associated with using a particular protocol, data throughput, type of data to be communicated, size of data to be communicated, and the like.

The internal sensors 435 may include any movement-related, location-related, and/or environmental-related sensors. For example, the internal sensors 435 may include a global positioning system (GPS), an accelerometer, a gyroscope, a barometer, a thermometer, a humidity sensor, a light sensor, a microphone, combinations thereof, and/or the like. The internal sensors 435 may measure, for example, position, location, velocity, acceleration, distance, rotation, altitude, temperature, humidity, pressure, sound, light, capacitance, inductance, resistance, voltage, chemical presence, combinations thereof, and/or the like. The internal sensors 435 may be coupled to the communication subsystem 430, such that sensor measurements may be transmitted off of the tagged pallet 307 to other devices or systems, as described further herein.

The memory 440 may be implemented using any combination of any number of non-volatile memories (e.g., flash memory) and volatile memories (e.g., DRAM, SRAM), or any other non-transitory storage medium, or a combination thereof media. In some embodiments, the memory 440 may be included in the processor 425. The power supply 445 may include any wired or wireless power supply, such as a power outlet supply, a solar panel, and/or a battery.

The beacon 410 may be coupled to one or more external sensors 450 on the tagged pallet 307 in some embodiments. The external sensors 450 may include, for example, a weight sensor and/or any of the sensors described above with respect to the internal sensors 435. In one example, the weight sensor may include circuitry that measures the weight of a load on the tagged pallet 307. The weight sensor may transmit the weight to the beacon 410. The beacon 410 may use the communication subsystem 430 to transmit this data off of the tagged pallet 307 to other devices or systems, as described further herein.

Figure 5:
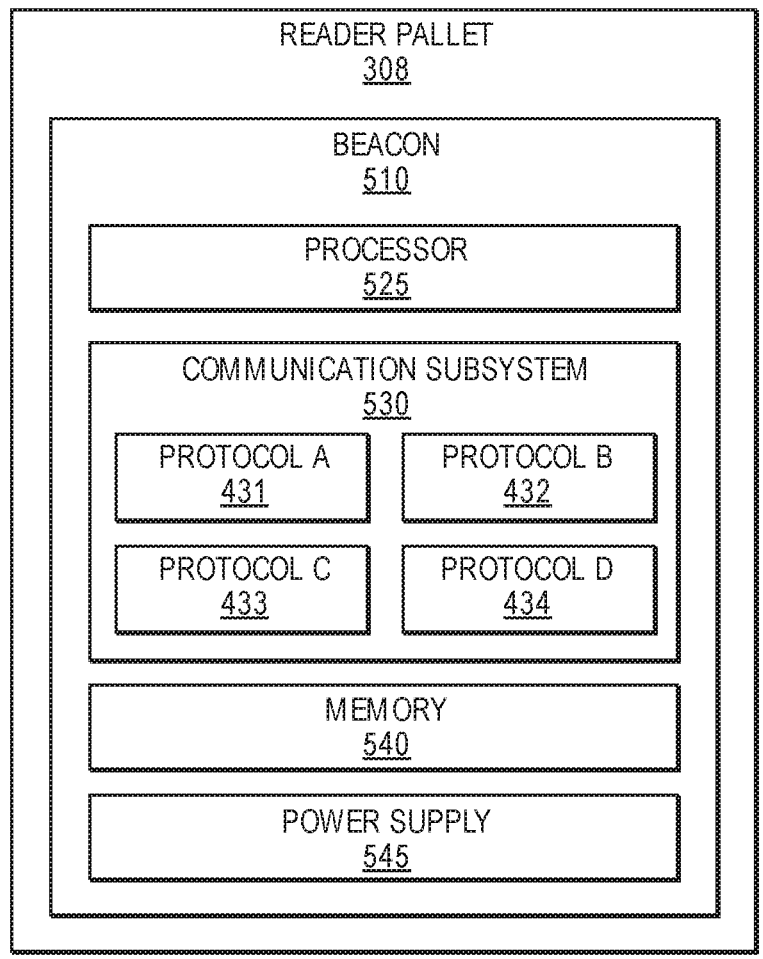
FIG. 5 is a block diagram illustrating a reader pallet, in accordance with some embodiments.

FIG. 5 is a block diagram illustrating the system components of a reader pallet 308. The reader pallet 308 may include a beacon 510. The beacon 410 may be implemented as the beacon 150, in some embodiments. The beacon 510 may include device hardware coupled to a memory 540. The device hardware may include a processor 525, a communication subsystem 530, and a power supply 545.

The processor 525 may be implemented as one or more integrated circuits (e.g., one or more single core or multicore microprocessors and/or microcontrollers), and may be used to control the operation of the beacon 510. The processor 525 can execute a variety of programs in response to program code or computer-readable code stored in memory 540, and can maintain multiple concurrently executing programs or processes. The communication subsystem 530 may include one or more transceivers and/or connectors that can be used by the beacon 510 to communicate with other devices (e.g., tagged pallets, beacons, access devices, etc.) and/or to connect with external networks. In some embodiments, the communication subsystem 530 may be configured to communicate using more than one protocol (e.g., protocol A 431, protocol B 432, protocol C 433, and/or protocol D 434). Protocol A 431, protocol B 432, protocol C 433, and/or protocol D 434 may be four different wired or wireless communication protocols. For example, protocol A 431, protocol B 432, protocol C 433, and/or protocol D 434 may be selected from the group including Bluetooth, Bluetooth LE, near field communication, WiFi, cellular communication, Ethernet, fiber optics, satellite, etc. In some embodiments, protocol A 431 and protocol B 432 may both be short range, lower power and/or lower cost communication protocols that may be used to communicate with tagged pallets. In some embodiments, protocol C 433 and protocol D 434 may both be longer range, higher power, and/or higher cost communication protocols that may be used to communicate with access devices, servers, and/or the like. The particular protocol used for a particular communication may be determined based on any of a number of factors, including availability, signal strength, type and/or amount of power received from or remaining on power supply 545, power needed to communicate on a particular protocol, cost associated with using a particular protocol, data throughput, type of data to be communicated, size of data to be communicated, and the like.

The memory 540 may be implemented using any combination of any number of non-volatile memories (e.g., flash memory) and volatile memories (e.g., DRAM, SRAM), or any other non-transitory storage medium, or a combination thereof media. In some embodiments, the memory 540 may be included in the processor 525. The power supply 545 may include any wired or wireless power supply, such as a power outlet supply, a solar panel, and/or a battery.

Figure 6:
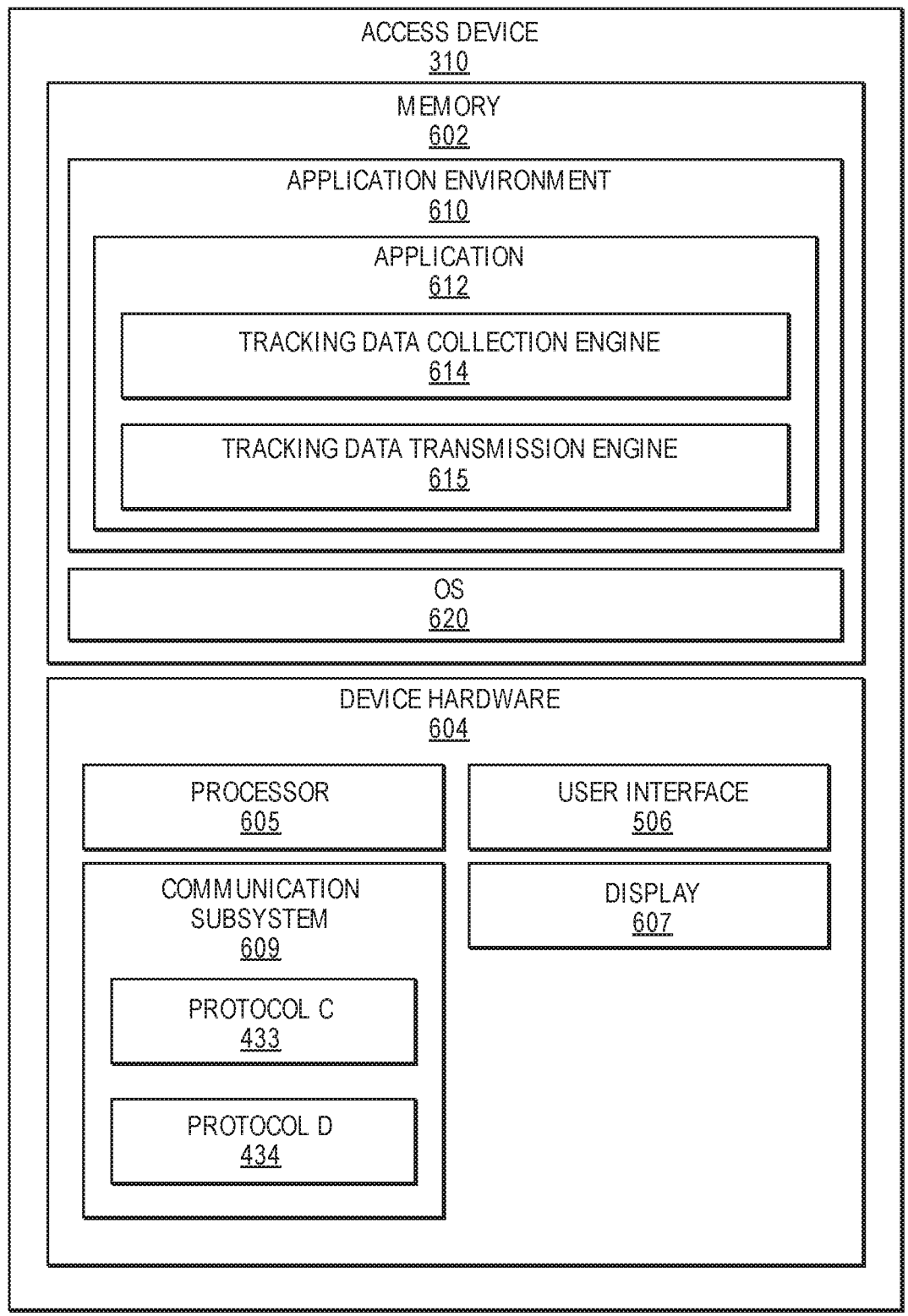
FIG. 6 is a block diagram illustrating an access device, in accordance with some embodiments.

FIG. 6 is a block diagram illustrating an optional access device 310, in accordance with some embodiments. The access device 310 may include device hardware 604 coupled to a memory 602. Device hardware 604 may include a processor 605, a communication subsystem 609, and a user interface 606. In some embodiments, device hardware 604 may include a display 607 (which can be part of the user interface 606).

Processor 605 can be implemented as one or more integrated circuits (e.g., one or more single core or multicore microprocessors and/or microcontrollers), and is used to control the operation of the access device 310. Processor 605 can execute a variety of programs in response to program code or computer-readable code stored in memory 602, and can maintain multiple concurrently executing programs or processes. User interface 606 can include any combination of input and output elements to allow a user to interact with and invoke the functionalities of the access device 310. In some embodiments, user interface 606 may include a component such as display 607 that can be used for both input and output functions. Memory 602 can be implemented using any combination of any number of non-volatile memories (e.g., flash memory) and volatile memories (e.g., DRAM, SRAM), or any other non-transitory storage medium, or a combination thereof media. Memory 602 may store an operating system (OS) 620 and an application environment 610 where one or more applications reside including application 612 to be executed by processor 605.

In some embodiments, application 612 may be an application that processes tracking data received from a reader pallet and transmits it to a server computer via a communication protocol. In some embodiments, the communication protocol used by the access device 310 may not be available to the reader pallet (e.g., wired Ethernet communications). Application 612 may include a tracking data collection engine 614 and a tracking data transmission engine 615. In some embodiments, one or more of these components can be provided by another application or component that is not part of application 612.

The tracking data collection engine 614 may be configured to, in conjunction with the processor 605 and the communication subsystem 609, receive aggregated tracking data associated with a number of tagged pallets from a reader pallet. The tracking data transmission engine 615 may be configured to, in conjunction with the processor 605 and the communication subsystem 609, transmit the aggregated tracking data to a server. In some embodiments, the tracking data collection engine 614 may receive tracking data at a first frequency, and the tracking data transmission engine 615 may transmit tracking data at a second frequency. For example, the tracking data collection engine 614 may receive tracking data once every two minutes, while the tracking data transmission engine 615 may transmit tracking data once every five minutes. This may allow the access device 310 to collect and aggregate multiple sets of tracking data from multiple reader pallets before transmitting the tracking data to a server computer. In some embodiments, these functions may be alternatively or additionally implemented in an additional reader pallet, instead of in an access device 310.

Communication subsystem 609 may include one or more transceivers and/or connectors that can be used by access device 310 to communicate with other devices (e.g., the reader pallet) and/or to connect with external networks (e.g., to connect to the server computer 320). The communication subsystem 609 may be configured to communicate according to protocol C 433 and/or protocol D 434. In some embodiments, protocol C 433 and protocol D 434 may both be longer range, higher power, and/or higher cost communication protocols that may be used to communicate with reader pallets, servers, and/or the like.

Figure 7:
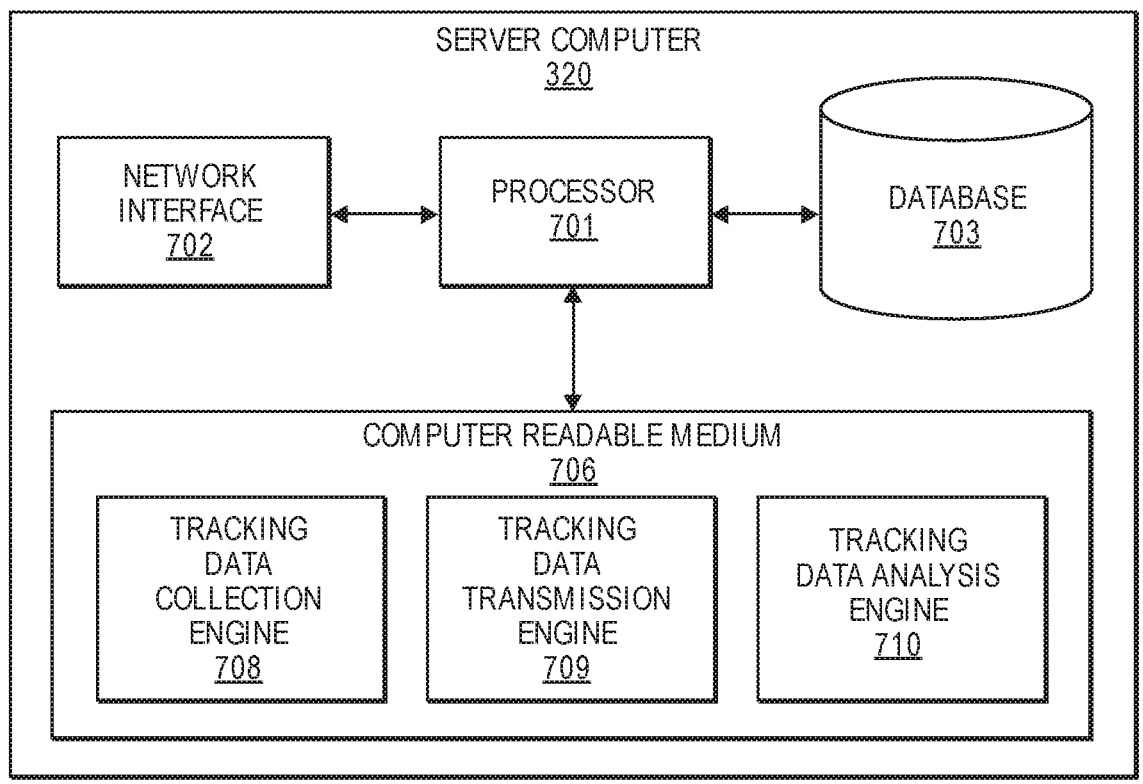
FIG. 7 is a block diagram illustrating a server computer, in accordance with some embodiments.

FIG. 7 is a block diagram illustrating a server computer 320, in accordance with some embodiments. Server computer 320 may include a processor 701 coupled to a network interface 702 and a computer readable medium 706. Server computer 320 may also include or otherwise have access to a database 703 that may be internal or external to the server computer 320.

Processor 701 may include one or more microprocessors to execute program components for performing the pallet tracking functions of the server computer 320. Network interface 702 may be configured to connect to one or more communication networks to allow the server computer 320 to communicate with other entities, such as the access device, the controller computer, reader pallets, etc. The network interface 702 may be configured to communicate according to protocol C 433 and/or protocol D 434 in some embodiments. In some embodiments, protocol C 433 and protocol D 434 may both be longer range, higher power, and/or higher cost communication protocols that may be used to communicate with reader pallets, servers, access devices, and/or the like.

Computer readable medium 706 may include any combination of one or more volatile and/or non-volatile memories, for example, RAM, DRAM, SRAM, ROM, flash, or any other suitable memory components. Computer readable medium 706 may store code executable by the processor 701 for implementing some or all of the pallet tracking functions of server computer 320. For example, computer readable medium 706 may include code implementing a tracking data collection engine 708, a tracking data transmission engine 709, and a tracking data analysis engine 710. In some embodiments, the tracking data analysis engine 710 may be optional and may instead be implemented by a controller computer 330.

The tracking data collection engine 708 may be configured to, in conjunction with the processor 701 and the network interface 702, receive aggregated tracking data associated with a number of tagged pallets from a plurality of reader pallets and/or a plurality of access devices. The tracking data transmission engine 709 may be configured to, in conjunction with the processor 701 and the network interface 702, transmit the aggregated tracking data to a controller computer. In some embodiments, the tracking data collection engine 708 may receive tracking data at a first frequency, and the tracking data transmission engine 709 may transmit tracking data at a second frequency. For example, the tracking data collection engine 708 may receive tracking data once every five minutes, while the tracking data transmission engine 709 may transmit tracking data once every ten minutes. This may allow the server computer 320 to collect and aggregate multiple sets of tracking data from multiple reader pallets and/or access devices before transmitting the tracking data to a controller computer.

In some embodiments, the server computer 320 may include a tracking data analysis engine 710. The tracking data analysis engine 710 may be configured to, in conjunction with the processor 701, use the tracking data to perform analytics. For example, the tracking data analysis engine 710 may determine whether the tagged pallets are at the correct facility, to determine where the tagged pallets are in the supply chain, to determine the cycle time of the tagged pallets, to predict timing of the tagged pallets at a particular location, to compute supply chain visibility metrics, etc. In some embodiments, supply chain visibility metrics may include inventory at a given facility or in a given region, dwell time, and velocity metrics between regions or between facilities in the supply chain. The server computer 320 may transmit these analytics to a controller computer via the network interface 702.

Methods for Pallet Tracking

Figure 8:
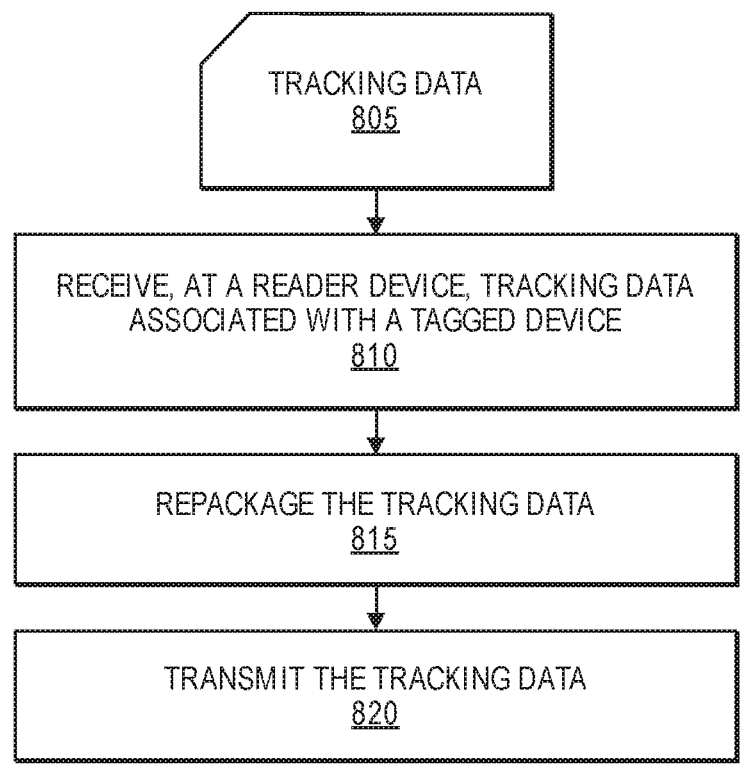
FIG. 8 is a flow chart illustrating a method for pallet tracking, in accordance with some embodiments.

A variety of methods may be implemented by the above-described systems. FIG. 8 is a flow chart illustrating an exemplary method for pallet tracking using a hub and spoke architecture, in accordance with some embodiments. At process block 810, tracking data 805 is received at a reader device affixed to a reader pallet of a plurality of pallets. In some embodiments, the plurality of pallets may be mobile. The tracking data 805 is associated with at least one tagged device affixed to at least one tagged pallet of the plurality of pallets. The reader device is configured to communicate using a first communication protocol and a second communication protocol. The at least one tagged device is configured to communicate using the first communication protocol. In some embodiments, the at least one tagged device is not configured to communicate using the second communication protocol. The tracking data 805 is received over the first communication protocol.

In some embodiments, the first communication protocol may be associated with a first communication range. The first communication range may define a maximum distance at which the tracking data 805 can be received over the first communication protocol. For example, when the tracking data is received at the reader device from the tagged device, the first communication range may be the maximum distance that the reader device can be positioned from the tagged device while still receiving the tracking data 805. The second communication protocol is associated with a second communication range. The second communication range may define a maximum distance at which the tracking data 805 can be received over the second communication protocol. For example, when the tracking data is transmitted from the reader device to a remote server, the second communication range may be the maximum distance that the reader device can be positioned from the remote server while still being able to transmit the tracking data 805. In some embodiments, the first communication range is less than the second communication range. For example, the first communication range may be fifty feet, while the second communication range may be a mile.

In some embodiments, the first communication protocol may be associated with a first power usage. The first power usage may define an amount of power used to transmit tracking data over the first communication protocol. The first power usage may be specific to the first communication protocol and/or the type or amount of tracking data to be transmitted. The second communication protocol may be associated with a second power usage. The second power usage may define an amount of power used to transmit tracking data over the second communication protocol. The second power usage may be specific to the second communication protocol and/or the type or amount of tracking data to be transmitted. In some embodiments, the first power usage is less than the second power usage. For example, the first communication protocol may be Bluetooth LE, while the second communication protocol may be traditional Bluetooth, cellular communications, etc.

At process block 815, the tracking data 805 is repackaged according to the second communication protocol. At process block 820, the tracking data 805 is transmitted over the second communication protocol. In some embodiments, the tracking data may be transmitted over the second communication protocol to a remote server. In some embodiments, the remote server is not configured to communicate using the first communication protocol. In some embodiments, the remote server is not configured to communicate with the tagged device. In some embodiments, the tracking data may be transmitted to an aggregation device affixed to an aggregation pallet of the plurality of pallets. The tracking data may be transmitted to the aggregation device using the first communication protocol and/or the second communication protocol. The aggregation device may be configured to transmit the tracking data to a remote server using a long range communication protocol (e.g., the second communication protocol).

In some embodiments, the at least one tagged device may be associated with a first communication frequency. The first communication frequency may define a rate at which the at least one tagged device transmits the tracking data over the first communication protocol. The reader device may be associated with a second communication frequency. The second communication frequency may define a rate at which the reader device transmits the tracking data over the second communication protocol. In some embodiments, the second communication frequency is less than the first communication frequency. For example, a tagged device may transmit tracking data to the reader device every 30 seconds. The reader device may aggregate this data for a period of 5 minutes, then transmit the tracking data to a remote server after that period.

In some embodiments, the reader device affixed to the reader pallet may communicate instruction data to the tagged pallets over the first communication protocol at the first communication frequency. The instruction data may cause one or more of the tagged pallets to perform one or more operations. For example, the instruction data may cause one of the tagged pallets to change or configure various device parameters or settings.

As noted, the computer-readable medium may include transient media, such as a wireless broadcast or wired network transmission, or storage media (that is, non-transitory storage media), such as a hard disk, flash drive, compact disc, digital video disc, Blu-ray disc, or other computer-readable media. The computer-readable medium may be understood to include one or more computer-readable media of various forms, in various examples.

In the foregoing description, aspects of the application are described with reference to specific embodiments thereof, but those skilled in the art will recognize that the invention is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as performing or being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined encoder-decoder (CODEC).

What is claimed is:

1. A computer-implemented method comprising:
receiving, at a reader device affixed to a reader pallet, data associated with a tagged device affixed to a tagged pallet, wherein:
the data are received using a first communication protocol, wherein the first communication protocol is selected from among a plurality of short-range communication protocols available to the reader device, and the first communication protocol is selected based at least in part on:
availability, signal strength, or power available to the reader device;
the reader device is configured to communicate using the first communication protocol and a second communication protocol; and
the reader pallet comprises:

a flat base configured to support a physical asset on top of the flat base; and a plurality of legs positioned to support the flat base and positioned to allow a forklift to engage the reader pallet between the plurality of legs;

sending, by the reader device to the tagged device, instructional data that is configured to cause the tagged device to perform at least one operation;

repackaging the data according to the second communication protocol; and transmitting the data over the second communication protocol.

2. The computer-implemented method of claim 1, wherein the data are not received using the second communication protocol.

3. The computer-implemented method of claim 1, wherein the first communication protocol is associated with a first communication range defining a maximum distance at which the data can be received over the first communication protocol, wherein the second communication protocol is associated with a second communication range defining a maximum distance at which the data can be received over the second communication protocol, and wherein the first communication range is less than the second communication range.

4. The computer-implemented method of claim 1, wherein the first communication protocol is associated with a first power usage defining an amount of power used to transmit data over the first communication protocol, wherein the second communication protocol is associated with a second power usage defining an amount of power used to transmit data over the second communication protocol, and wherein the first power usage is less than the second power usage.

5. The computer-implemented method of claim 1, wherein the data are not transmitted over the first communication protocol.

6. The computer-implemented method of claim 1, wherein the tagged device is associated with a first communication frequency defining a rate at which the tagged device transmits the data over the first communication protocol, wherein the reader device is associated with a second communication frequency defining a rate at which the reader device transmits the data over the second communication protocol, and wherein the second communication frequency is less than the first communication frequency.

7. A computer-program product tangibly embodied in a non-transitory machine-readable storage medium of a reader device, including instructions that, when executed by one or more processors, cause the one or more processors to:

receive, at the reader device affixed to a reader pallet, data associated with a tagged device affixed to a tagged pallet, wherein:

the data are received using a first communication protocol, wherein the first communication protocol is selected from among a plurality of short-range communication protocols available to the reader device, and the first communication protocol is selected based at least in part on:

availability, signal strength, or power available to the reader device;

the reader device is configured to communicate using the first communication protocol and a second communication protocol; and the reader pallet comprises:

a flat base configured to support a physical asset on top of the flat base; and a plurality of legs positioned to support the flat base and positioned to allow a forklift to engage the reader pallet between the plurality of legs;

send, by the reader device to the tagged device, instructional data that is configured to cause the tagged device to perform at least one operation;

repackage the data according to the second communication protocol; and transmit the data over the second communication protocol.

8. The computer-program product of claim 7, wherein the reader device stores a type of physical asset located on the reader pallet and a pallet identifier for the reader pallet.

9. The computer-program product of claim 7, wherein the reader device does not include any environmental sensors.

10. The computer-program product of claim 7, wherein the reader device:

collects data from a plurality of tagged pallets;

aggregates the data collected from the plurality of tagged pallets over a time interval; and transmits the aggregated data using the second communication protocol.

11. The computer-program product of claim 7, wherein the at least one operation to be performed by the tagged device comprises a change in parameter settings for the tagged device.

12. The computer-program product of claim 7, wherein the data associated with the tagged device comprises a pallet identifier, and wherein the pallet identifier is associated with an entry in a database at a server in which the data is stored after being transmitted using the second communication protocol.

13. A system comprising:

a reader pallet comprising:

a flat base configured to support a physical asset on top of the flat base; and a plurality of legs positioned to support the flat base and positioned to allow a forklift to engage the pallet between the plurality of legs; and a reader device integrated with the pallet, the reader device comprising:

a processor; and a memory storing instructions which, when executed by the processor, cause the processor to perform operations including:

receiving data associated with a tagged device affixed to a tagged pallet, wherein the data are communicated using a first communication protocol, wherein the first communication protocol is selected from among a plurality of short-range communication protocols available to the reader device, and the first communication protocol is selected based at least in part on: availability, signal strength, or power available to the reader device; and wherein the reader device is configured to also communicate using a second communication protocol;

sending, to the tagged device, instructional data that is configured to cause the tagged device to perform at least one operation;

repackaging the data according to the second communication protocol; and causing the data to be transmitted using the second communication protocol after the data has been repackaged according to the second communication protocol.

14. The system of claim 13, wherein the reader device further comprises a global positioning system (GPS) sensor, a gyroscope, a barometer, a humidity sensor, a light sensor, a microphone, and an accelerometer.

15. The system of claim 13, further comprising a smart phone that is located in a same facility as the reader pallet, wherein the data are transmitted to the access device using the second communication protocol.

16. The system of claim 15, further comprising a server that is part of a cloud computing environment, wherein the data are transmitted to the server using the second communication protocol.

17. The system of claim 16, further comprising a controller computer, wherein the controller computer is configured to determine whether the tagged pallet is at a correct facility in a supply chain.

18. The system of claim 16, further comprising a controller computer, wherein the controller computer is configured to predict a time which the tagged pallet will be at a particular location in a supply chain.

19. The system of claim 13, wherein the second communication protocol is selected from among a second plurality of long-range communication protocols available to the reader device, wherein the second communication protocol is selected based at least in part on: availability, signal strength, or power available to the reader device.

* * * * *